US010535280B2

(12) United States Patent
Kohn

(10) Patent No.: US 10,535,280 B2
(45) Date of Patent: Jan. 14, 2020

(54) MULTI-FUNCTION ELECTRONIC GUIDANCE SYSTEM FOR PERSONS WITH RESTRICTED VISION

(71) Applicant: Jacob Kohn, Cape Coral, FL (US)

(72) Inventor: Jacob Kohn, Cape Coral, FL (US)

(*) Notice: Subject to any disclaimer, the term of this patent is extended or adjusted under 35 U.S.C. 154(b) by 279 days.

(21) Appl. No.: 15/411,262

(22) Filed: Jan. 20, 2017

(65) Prior Publication Data

US 2017/0213478 A1    Jul. 27, 2017

Related U.S. Application Data

(60) Provisional application No. 62/281,296, filed on Jan. 21, 2016.

(51) Int. Cl.
| G06K 9/00 | (2006.01) |
| G09B 21/00 | (2006.01) |
| H04N 7/18 | (2006.01) |
| H04R 1/10 | (2006.01) |
| G01S 19/13 | (2010.01) |
| G01S 19/14 | (2010.01) |
| G01S 19/48 | (2010.01) |
| G01S 5/02 | (2010.01) |
| H04S 7/00 | (2006.01) |
| H04R 1/02 | (2006.01) |
| H04R 5/033 | (2006.01) |

(52) U.S. Cl.
CPC .......... *G09B 21/006* (2013.01); *G01S 5/0263* (2013.01); *G01S 19/13* (2013.01); *G01S 19/14* (2013.01); *G01S 19/48* (2013.01); *H04N 7/185* (2013.01); *H04R 1/028* (2013.01); *H04R 1/1008* (2013.01); *H04S 7/304* (2013.01); *H04R 1/105* (2013.01); *H04R 5/033* (2013.01); *H04S 2400/11* (2013.01)

(58) Field of Classification Search
CPC ....... G09B 21/006; G01S 19/14; G01S 19/48; G01S 5/0263; G01S 19/13; H04R 1/028; H04R 1/1008; H04R 5/033; H04R 1/105; H04S 7/304; H04S 2400/11; H04N 7/185
See application file for complete search history.

(56) References Cited

U.S. PATENT DOCUMENTS

| 5,724,313 | A | * | 3/1998 | Burgess | ................. | A61H 3/061 367/102 |
| 5,818,381 | A | * | 10/1998 | Williams | ............... | A61H 3/061 342/24 |
| 2013/0044130 | A1 | * | 2/2013 | Geisner | .................... | G09G 5/00 345/633 |
| 2013/0115579 | A1 | * | 5/2013 | Taghavi | .................. | G06F 3/016 434/113 |
| 2015/0063610 | A1 | * | 3/2015 | Mossner | ................. | H04S 5/005 381/307 |
| 2016/0025499 | A1 | * | 1/2016 | Moore | ................. | G01C 21/165 701/1 |

(Continued)

*Primary Examiner* — Howard D Brown, Jr.
(74) *Attorney, Agent, or Firm* — William E. Noonan

(57) ABSTRACT

An electronic guidance system for visually impaired persons includes a sensor for detecting the proximity and orientation of an approaching object and a microprocessor that is programmed to translate signals from the sensor into audible signals that are projected by directionally oriented speaker components into the user's ears. The system enables the user to determine the proximity, location, movement and identity of the approaching object.

20 Claims, 8 Drawing Sheets

(56) References Cited

U.S. PATENT DOCUMENTS

| | | | |
|---|---|---|---|
| 2016/0033280 A1* | 2/2016 | Moore | G01C 21/165 |
| | | | 701/472 |
| 2016/0078278 A1* | 3/2016 | Moore | G06K 9/00201 |
| | | | 345/8 |
| 2016/0080897 A1* | 3/2016 | Moore | H04W 4/02 |
| | | | 340/539.13 |
| 2016/0225286 A1* | 8/2016 | Dayal | G09B 21/006 |
| 2017/0180847 A1* | 6/2017 | Delamour | G10K 11/22 |
| 2017/0213478 A1* | 7/2017 | Kohn | G09B 21/006 |
| 2018/0283891 A1* | 10/2018 | Andrew | G01C 21/3629 |

\* cited by examiner

MULTI-FUNCTION ELECTRONIC GUIDANCE SYSTEM FOR PERSONS WITH RESTRICTED VISION

RELATED APPLICATION

This application claims the benefit of U.S. Provisional Application Ser. No. 62/281,296 filed Jan. 21, 2016.

FIELD OF THE INVENTION

This invention relates to a multi-function electronic system for guiding and assisting the movement of visually impaired persons as well as persons whose vision is restricted due to darkness, smoke, or other light obstructing conditions. More particularly, the system employs intelligent translational software and a directionally oriented speaker system that allow the user to better identify and recognize approaching objects and more effectively and safely navigate his or her movements.

BACKGROUND OF THE INVENTION

Traditionally, visually impaired persons have commonly experienced limited mobility due to hazardous obstacles, sudden and/or unexpected changes in the underlying walking surface, (i.e. stairways, hills, pot holes, etc), as well as a host of other potentially dangerous or disruptive situations (e.g. passing vehicles, pets and other persons) they may encounter. Individuals having visual impairments have often resorted to the use of a cane or service dog. However, both of these aids have serious limitations and can be particularly unreliable at detecting sudden or unexpected obstacles or other potential dangers. They also fail to provide the user with locational information or navigational guidance.

Recently, electronic systems have been developed for warning visually impaired persons of approaching obstacles and impediments. However, most of these are limited to simply notifying the user that a potential obstacle is approaching. Products have also been introduced that attempt to advise the user of the type of object he or she is approaching. In one of these, an electronic camera transforms a digital image of the approaching object into an electrical signal that stimulates the user's tongue. Unfortunately, it takes an inordinate amount of time for the user to decipher the electrical stimulus from the tongue and associate it with an image of the approaching object. An alternative method involves implanting an image stimulating electronic component in the user's retinas. This technique is unproven and, in any event, is prohibitively expensive for most potential users.

SUMMARY OF THE INVENTION

It is therefore an object of the present invention to provide an electronic guidance system for visually impaired persons, which allows the user to effectively identify surrounding and approaching objects so that potential dangers are better avoided and the user's mobility is improved significantly.

It is a further object of this invention to provide an electronic guidance system for visually impaired persons that enables the user to effectively perform a variety of functions including distinguishing identifying and/or recognizing approaching or surrounding objects and persons, ascertaining location and directional information and enabling the user to better and more safely navigate their surroundings.

It is a further object of this invention to provide an electronic guidance system for visually impaired persons that employs a directionally based auditory system as well as intelligent translating software that enable the user to more quickly and correctly ascertain the nature of an approaching object as well as its distance and direction.

It is a further object of this invention to provide an electronic guidance system for visually impaired persons that transforms the images of approaching or surrounding objects into respective identifiable sounds that the brain processes naturally and in real time to determine the direction and distance of the object.

It is a further object of this invention to provide an electronic guidance system that may be used effectively and safely by firefighters, emergency personnel, the military and others required to move about in low light and vision obstructed conditions.

It is a further object of this invention to provide a surround sound speaker that provides persons having restricted vision with a reliable indication in real time of the nature, direction, distance and movement of approaching objects so that the person is able to more effectively and safely navigate his or her movements.

This invention features an electronic system for guiding and assisting the movements of a visually impaired person or other person with restricted vision. The apparatus includes an object sensor that is worn by the user. The sensor detects approaching or nearby objects encountered as the user moves. The sensor delivers signals representative of detected objects to a CPU controller or microprocessor programmed by intelligent translating software, which converts the sensed object signals to corresponding auditory signals representing the distance, direction and/or nature of the detected object. Speed of a vehicle or other moving object can also be detected. The microprocessor directs the auditory signals to a speaker system that is mounted adjacent the user's ear canal. The speaker system includes multiple, directionally diverse speakers that preferably produce a sound that allows the user to determine the nature of the sensed object. The speakers also preferably produce a sound having an auditory quality (e.g. frequency, pitch, interval) that allows the user to determine the height, direction, distance and velocity of the sensed object.

In a preferred embodiment, the sensor may include various types of technology including, but not limited to sonar, laser measuring devices, radar and intelligent cameras. One or more sensor components may be employed and mounted on eyeglasses or a belt, arm band, leg band, vest or other item worn by the sight impaired or visually restricted user. Preferably, the sensor monitors visual images of approaching or nearby objects at three distinct height levels. A lower sensor portion continuously scans a space approximately 3"×3" immediately in front of each of the left and right feet of the user in order to determine whether the user is approaching a smooth, solid and uninterrupted surface or is about to encounter an impediment or a surface height variation. A second sensor portion scans images of objects located between the user's knees and chest. This effectively detects approaching objects such as furniture, bicycle racks, fences and motor vehicles. A third sensor portion scans the height in front of the user extending from about the chest level to above the user's head. This detects approaching items that may be suspended or low hanging.

For each sensor height or zone, the apparatus is programmed to produce a respective predetermined frequency indicating that the zone or level is clear of obstructions. Alternatively, different frequency sounds are produced within each zone when an obstruction is approached and, in accordance with the teaching of this invention, different frequencies can be assigned to particular persons, animals and objects, which enables the trained user to identify and recognize such persons, animals or objects as they approach. The apparatus may be calibrated for the particular user's height.

Each speaker assembly may include multiple speaker units that are mounted on arms spaced apart from a respective ear sufficiently so the user can hear natural sounds as well as sounds produced by the speakers. The speakers may be positioned forwardly and rearwardly relative to each ear as well as above, below or otherwise proximate upper and lower ends of the ears to correspond with and effectively convey to the user the direction and height of an approaching or reaching object. Audio signals may be transmitted to the speakers at various intervals or volumes to indicate the relative distance of the approaching object from the user. This can better assist the user in navigating his or her travels.

The system may be provided with an optical database that includes a virtually limitless collection of common objects (e.g. persons, animals, automobiles, walls, furniture etc.) which the user may encounter as he or she is navigating a certain path. The images of persons and objects known to the user may also be added to the database as desired. Photo recognition software may be utilized by the microprocessor to identify particular items from the optical database that are encountered by the user. In certain embodiments, a sound database may be utilized to assign particular sounds to particular objects that are encountered. Alternatively, the user may ask the system to provide a verbal identification of a particular object or individual being encountered. The user may make such a query by various means including voice and manually activated electronic buttons.

A GPS system may be integrated or associated with the controller or microprocessor for providing the user with geographical location, distance and directional information as requested. Information provided by the GPS may be accessed by the user through various means including voice queries and electronic buttons.

The speaker system may include at least one earphone for being worn over a corresponding ear of the user. The earphone preferably carries nine directionally diverse speaker units in an array wherein, when the earphone is operatively engaged with the user's ear, a first set of three speaker units are arranged generally vertically over and directed audibly toward the user's inner ear, a second set of three speaker units are arranged generally vertically over and directed audibly toward the user's middle ear and a third set of speaker units are arranged generally vertically over and directed audibly toward the user's outer ear. The speaker system may include a headset for extending across and being worn on the user's head. Each earphone may be attached to a respective end of the headset and positioned over a corresponding ear of the user when the headset is worn by the user.

Each earphone may be constructed for sealably engaging a corresponding ear of the user. The speaker units may be mounted in a cavity of the earphone such that the speaker units are enclosed within the cavity of the earphone when the headphone is sealably engaged with the corresponding ear of the user.

Each earphone may alternatively include an open frame on which the speaker units are mounted. The frame may include a horizontal support bracket attached to a respective end of the headset. Three generally vertical brackets may be attached to the support bracket. Each generally vertical bracket may support a respective set of the speaker units. Each generally vertical bracket may include a concave curvature for generally facing the user's corresponding ear. Each set of speaker units may include a spaced apart pair of speaker units mounted to a corresponding generally vertical bracket proximate respective ends of that bracket and a third speaker unit attached to the corresponding generally vertical bracket between the spaced apart pair of speaker units.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
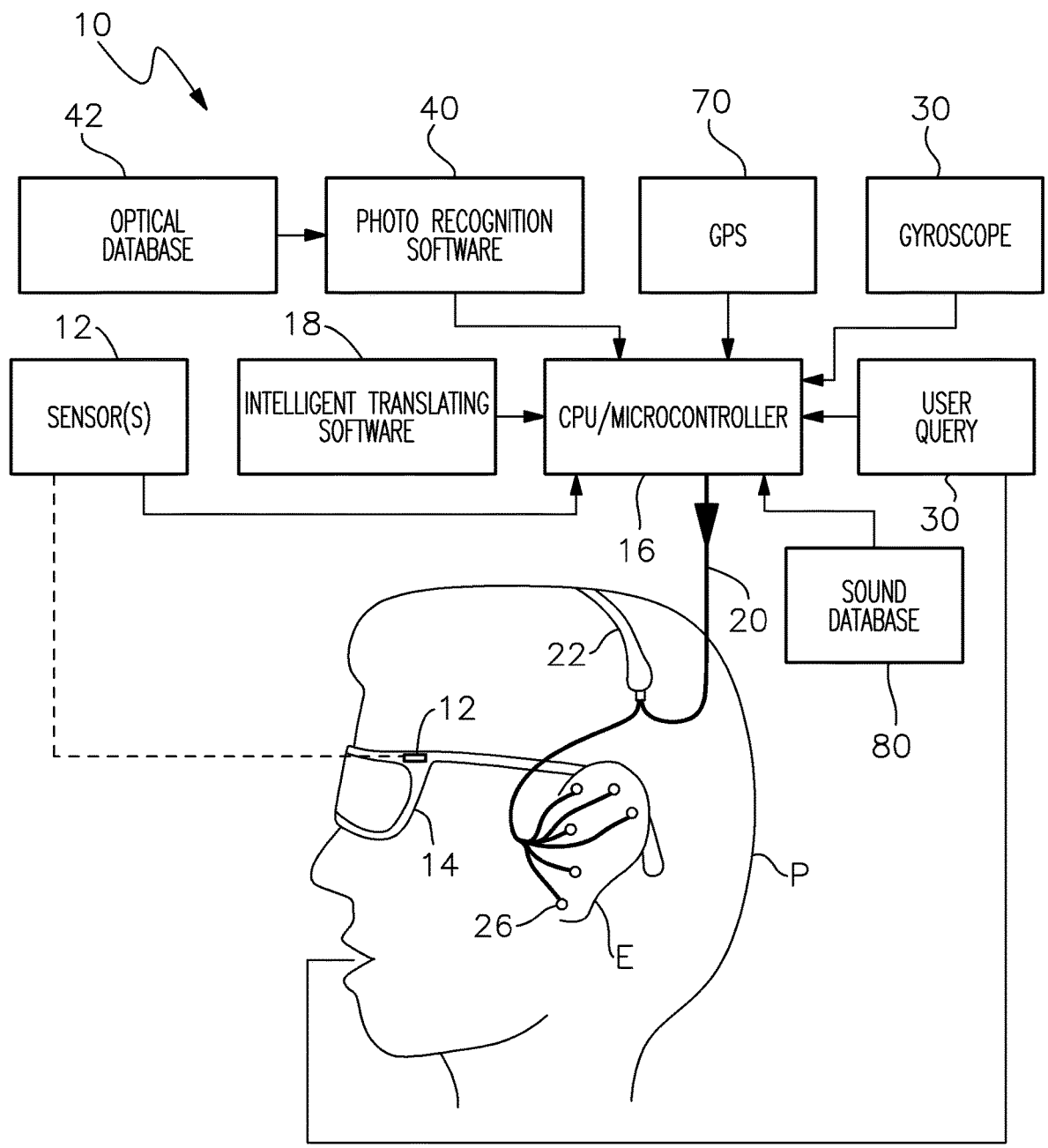
FIG. 1 is a simplified schematic view of the electronic guidance system of this invention.
Figure 2:
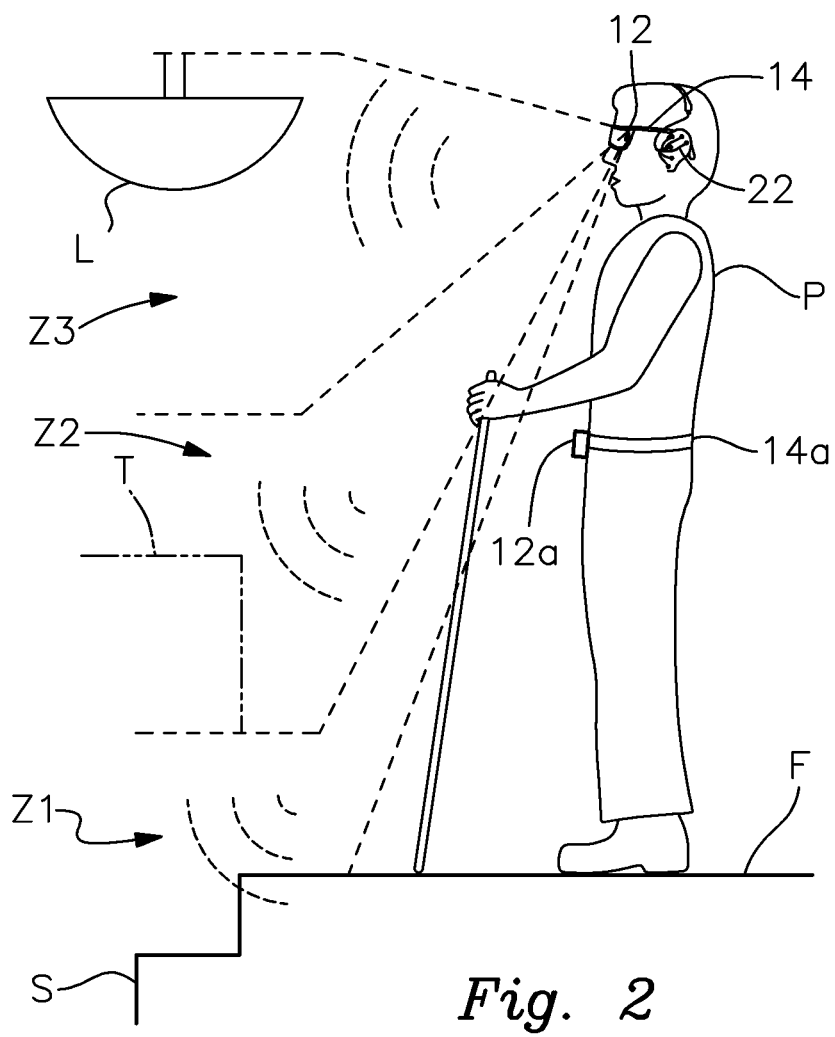
FIG. 2 is an elevational side view depicting use of the system by a visually impaired person to detect the distance and direction of various objects and surface features that the user is approaching while walking.

There is shown in FIGS. 1 and 2 an electronic guidance system 10 designed to be used by a visually impaired person P in order to assist and guide that person while walking or otherwise traveling (e.g. by bicycle, golf cart, etc.). It should be understood that system 10 may be employed in virtually all types of locations and environments where person P wishes to safely, quickly and successfully move from one point to another. The particular location or environment in which system 10 may be utilized should not be construed as a limitation of this invention. The primary purpose of system 10 is to quickly and accurately discern the nature, distance and direction of approaching objects so that the user avoids unintended obstacles and potential dangers and is able to thereby move from one location to another in a faster, more efficient and much safer manner. The system also provides various useful information that facilitates the user in successfully reaching his or her desired destination whether that be inside a building, ascending or descending a stairway, navigating a busy sidewalk, crossing a street or otherwise.

It should be understood that the electronic guidance system also may be employed effectively by other individuals encountering and attempting to navigate low light conditions or situations where vision is greatly reduced. This can include firefighters or other emergency personnel traveling through a smoke or fog-filled location. Additionally, the navigational system is beneficial for use by military and law enforcement personnel during nighttime operations or at other times when vision is significantly diminished. The guidance system, and in particular the speaker system disclosed herein, may also be employed in various electronic gaming applications.

System 10 includes one or more sensor components 12 that may comprise sonar sensors, laser measuring devices, radar detectors, light/photo detectors or other types of transceiver devices, which may be mounted to a pair of eyeglasses 14 worn by user P. Alternatively, the sensor may comprise an intelligent camera or other type of optical detector mounted to eyeglasses 14. In still other embodiments, the sensor may comprise a belt mounted unit 12a as shown in FIG. 2. Various other types of sensing technology may be employed within the scope of this invention. In each case the sensor component 12, 12a is constructed in a manner that enables system 10 to detect approaching objects and surface features such as, for example, stairs S, table T and overhead lighting fixture L, which may be approached by user P, as shown in FIG. 2. It should be understood that these sensors should be capable of detecting virtually any and all types of objects including fixed and moving objects, inanimate objects and living things (persons and pets). The technology used to detect such objects may include assorted sonar, radar, laser, light, intelligent phone, infrared or other technologies that will be understood to persons skilled in the art. Any known or available detection technology may be used within the scope of this invention. It should also be understood that multiple sensors 12, 12a may be employed in system 10. For example, a sensor 12 may be employed adjacent each lens of eyeglasses 14. A single representative such sensor is shown in FIG. 2.

System 10 also includes a central processing unit (CPU) comprising a microprocessor 16, FIG. 1, or alternative electronic controller, which may be mounted to either eyeglasses 14, belt 14a, FIG. 2, or elsewhere on person P. CPU 16 may be housed in a separate unit or integrated within a single unit that also contains the sensor. Sensors 12, 12a provide signals representative of detected objects to CPU 16, either through wires or wirelessly, using known means of electronic interconnection. Various types of electronic processing units may be employed within the scope of this invention.

Figure 3:
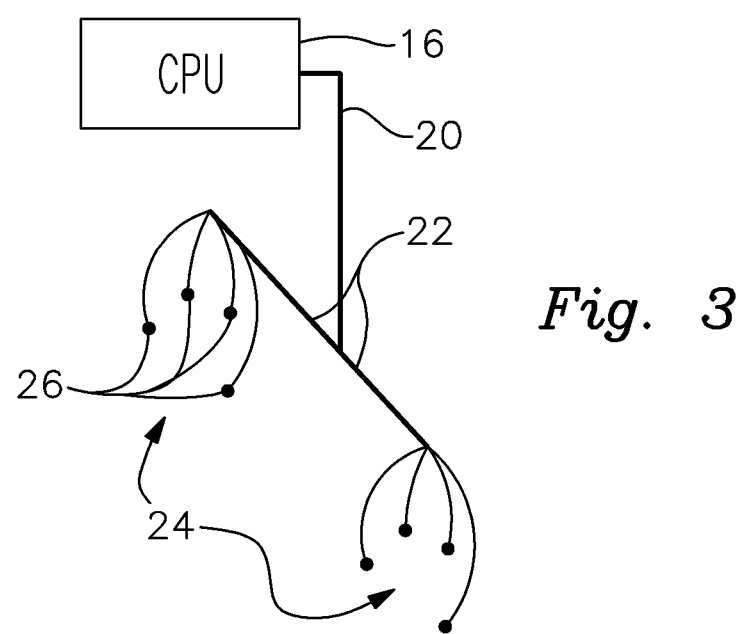
FIG. 3 is a simplified schematic view of the speaker system that may be employed by the guidance system of this invention.

CPU 16 is programmed by intelligent software 18, which translates the signals received from object sensors 12, 12a into representative sound signals as described more fully below. These representative sound signals are directed from CPU 16 via output 20 to a headset 22 comprising a pair of earphone speaker assemblies 24, each held proximate a respective one of the user's ears E. Headset 22, which is shown schematically in FIG. 3, includes a pair of speaker assemblies 24. Each speaker assembly 24 includes a plurality of individual speaker units 26 that are arranged such that when the headset is worn by the user, the speaker units are positioned in a directionally diverse manner at various locations proximate the respective ear E over which the speaker assembly 24 are held. FIG. 1 depicts five speaker components and FIGS. 2 and 3 illustrate the headset as including four speaker components. Typically, the speaker units will be positioned proximate the front, back, top and bottom of each ear so that sounds produced by the speaker are directionally received and understood by the ear. The speaker units produce a surround sound effect. Preferably, the speakers are designed to be positioned approximately 1-3" away from each ear E when headset 22 is worn by the user. This allows the user to clearly hear and process ambient and natural sounds which can further facilitate the user's movement. Each speaker unit is carried on a small, thin flexible wire strip. The individual speaker units 26 are held outside of the ear so that they do not interfere with that ear's reception of natural surrounding sounds that are not generated by system 10. The speakers may comprise piezo electric speakers or other compact electronic speakers of the type that will be known to persons skilled in the art. It should be understood that the size, configuration and numbers of speaker components may be varied within the scope of this invention. Typically the speaker system and individual speaker units are connected wirelessly to the output of CPU 16. Although in alternative embodiments wired interconnections may be used.

Sensors 12, 12a and intelligent translating software 18 detect and differentiate objects and obstacles in three discrete elevational or height zones. Initially, system 10 is calibrated to the specific height of the individual user. As the user faces and moves forwardly, a portion of at least one sensor 12, 12a continuously scans an area of approximately 3"×3" directly in front of either the user's left or right feet as each successive step is taken. The system thereby effectively scans a lower zone Z1, as shown in FIG. 2. This zone extends from the underlying surface to approximately the height of the user's knee. As the user walks along the underlying floor F or other indoor/outdoor surface, signals received from the sensed underlying surface are translated by software 18 such that CPU 16 produces no sound at all or, alternatively, a low volume baseline hum at approximately 130 Hz. This sound may be projected from the speaker components 26 of headset 22 so that the user is advised and understands from the generated sound that a level walking surface, free of obstacles, holes and significant height variations lies ahead of his next step. Signals produced from floor F ahead of the user's left foot are directed to the user's left ear whereas signals generated ahead of the user's right foot produce the above described baseline sound in the speaker located proximate his or her right ear. A person who is trained and experienced in the use of system 10 understands the receipt of the assigned 130 Hz floor detecting sound frequency as an indication that it is safe to proceed along floor F. Accordingly, the user will learn to eventually ignore the standard or baseline sound or, in some cases, the absence of sound from the speaker.

When user P approaches an obstacle in lowermost zone Z1 or the height level of floor F suddenly changes, as can occur when user P approaches a stairway S, sensor 12, 12a detects this impediment or change and microprocessor 16 is programmed to respond and produce a different sound frequency. For example, the microprocessor may be programmed so that when the sensor 12,12a detects a drop in the level of floor F or other underlying surface (which may be caused by a descending step, pothole or other sudden drop), the processor produces a lower frequency sound (e.g. 90 Hz) well below the standard baseline frequency of 135 Hz. This advises the user that he or she is approaching a drop in the floor reflected by stairway S. Alternatively, an upcoming obstacle (not shown) on floor F within zone Z1 may cause the translating software 18 to direct microprocessor 16 to produce a higher frequency (e.g. up to 170 Hz) sound. The microprocessor may also be programmed as desired to produce a pitch that represents the height of an upcoming obstacle or, alternatively, the drop in the floor level within zone Z1. For example, a rise in frequency may reflect the height of an approaching step in an ascending stairway. The microprocessor may be programmed so that a ten inch riser raises the frequency from the baseline of 135 Hz to 145 Hz. Likewise, software 18 may direct microprocessor 16 to produce a reduced frequency of 125 Hz in order to reflect a ten inch descending step. The microprocessor may also be programmed to reflect the type of surface that the user is traversing. A solid, concrete or wood floor may produce a different frequency baseline hum than that produced by a grass or sand surface.

Microprocessor 16 may also be programmed to produce differing sounds that indicate the distance between the user and the approaching object or elevational variation. For example, the microprocessor may vary the volume, duration and/or interval of beeps or other sounds sent to the speakers based upon the user proximity to the approaching object, obstacle or elevational change. A shorter beeping or tonal pattern interval or time duration and/or a louder volume typically indicates that the approaching object, obstacle or elevation change is closer whereas a longer duration or interval and/or a softer sound indicates that the obstacle is receding from the user.

As shown in FIG. 1, a gyroscope 30 may be operatively connected to CPU 16 to alert the user when his or her head is tilting downwardly or upwardly. The microprocessor may be programmed by software 18 so that the standard baseline hum includes short silent pauses, which continue until the user's head faces directly forward. In that case, the pauses are eliminated and a continuous baseline hum resumes. Typically, the gyroscope is incorporated into the user's eyeglasses 14. In certain embodiments, the microprocessor may be programmed to eliminate the production of a humming sound when the user achieves a desired level of training or skill and prefers not to use the baseline sound.

Sensors 12, 12a also scan for and detect obstacles in zone Z2, FIG. 2, representing a height level extending from about the knees up to the chest of the user. Obstacles, such as table T, that are detected within zone Z2 cause microprocessor 16 to produce sounds having a frequency of about 145 Hz to 165 Hz. Such sounds are then directed to the mid-level speakers, i.e. the speakers located at the front and back of the ear as shown in FIG. 1. The frequency of the sound produced corresponds to the height of the obstacle or barrier within zone Z2. Objects within this zone may comprise various pieces of indoor furniture, appliances, outdoor fences, police barricades, etc. If the obstruction extends across the entire path being traveled by the user, software 18 directs microprocessor 16 to send corresponding frequency sound signals to both speaker components 24. Conversely, if the obstruction blocks only half of the user's path, such as in a case where a pipe or other impediment projects from a wall and blocks only one side of the user's path, the high frequency warning sounds will be directed to only the speaker assembly closest to the impediment. This alerts the user to move aside and safely avoid the projecting obstruction.

Microprocessor 16 is similarly programmed to process detected signals from sensors 12, 12a, which indicate an obstruction, such as a hanging lighting fixture L in an upper zone Z3. This upper zone extends generally from the user's chest to above the user's head. Software 18 directs microprocessor 16 to produce audio signals above 165 Hz in response to the detection of approaching items in zone Z3. Such audio signals are transmitted to only the speaker components 26 in the upper part of speaker assembly 24, i.e. positioned proximate the upper end of the user's ear. As the user approaches an object such as lighting fixture L in zone Z3, the signals received by sensor 12, 12a representing obstruction L are translated into the high frequency (+165 Hz) audio signals that warn the user to avoid the overhead obstruction.

It should be noted that, as with obstructions and level changes detected in lowermost zone Z1, system 10 may be programmed to detect the proximity, height and angular orientation of impediments and obstacles within respective zones Z2 and Z3. Specifically, as the user approaches the obstruction, the volume, and/or duration of the produced warning sounds may be increased. By the same token, if a succession of beeping signals are produced to indicate a nearby impediment, the interval between beeps may be shortened as an obstruction is approached. This alerts the user as to the proximity as to the approaching obstruction or obstacle. Likewise, the translating software and the directionally oriented speaker components provide the user with an accurate and natural indication of the angle and height of the obstruction relative to the user. An obstruction to the right or left to the user may be reflected in individual speaker components of the left hand and right hand speakers respectively. Likewise more elevated obstructions generate sounds that are sent to the upper speaker components 26, whereas lower obstructions produce sounds that are sent to lower speaker components 26. This provides the user with a very natural indication of where the obstacle is located relative to the user both with regard to height and angular orientation. System 10 allows the user to travel a desired route and avoid impediments much more successfully and safely than has been heretofore possible.

Microprocessor 16 may be provided with photo recognition software 40, FIG. 1, that is used in conjunction with an obstacle database 42 having a virtually limitless supply of optical images representing commonplace objects. In the event that user P is alerted to an upcoming obstacle by receiving an audio signal as previously described, the user can quickly and conveniently research and ascertain the precise nature of that article by sending a query to system 10. Specifically, user P activates a user query function 50 which may comprise either an electronic button or a verbal query function as is conventionally employed in cellular telephone technology. When query function 50 is activated, the photo recognition software instructs the microprocessor to compare the image sensed by sensor 12 (which, in such embodiments, will typically comprise a digital camera) against stored images contained in optical database 42. The system then verbally identifies the detected item (e.g. person, animal on a leash, light pole, fence, etc.) for the user through speaker system 22.

GPS component 70 is also connected to microprocessor 16 and provides geographic locational and directional information to the microprocessor, which the user can access, again using a user query function 50. This allows the user to travel to unfamiliar areas without the fear of getting lost or disoriented. The user query may be activated by the touch of an electronic button or through a verbal request. The system can also be programmed so that the GPS and microprocessor immediately and audibly warn the user that he or she is approaching an intersection. When an intelligent camera is used as a detector, the camera can send signals to the microprocessor which warns the user instantly (i.e. in real time), for example, that he or she is stepping into a crosswalk or approaching a WALK/DON'T WALK sign. Radar detectors can effectively sense vehicles traveling along a roadway that the visually impaired user is approaching.

Such sensors are especially useful for assessing the speed of an approaching vehicle. Software 18 can then immediately convert this information to a warning which is sent from microprocessor 16 audibly to the user through the headset 22.

The sensors 12, 12a are integrated in system 10 to effectively detect and relay signals of approaching objects that are themselves moving and occupy all three elevational zones Z1, Z2 and Z3. Typically, this would occur in the case of an approaching person. In that case, the user would receive sensed signals from the lower, mid and upper zones, which signals would be translated into sounds having respective volume, interval and directional frequency characteristics associated with each zone. The brain of the experienced/trained user simultaneously processes the generated sounds projected by speaker assemblies 24 in real time. This provides that user with a good indication of the height, distance and angular orientation (right, center or left) of the approaching individual. As a result, the user is better able to avoid bumping into the approaching person by stepping aside and proceeding safely and conveniently ahead in an unimpeded manner.

System 10 can also be equipped with a sound database 80, FIG. 1, which again operates in conjunction with an intelligent camera sensor. In particular, the user may assign specific sounds from the database to sensed persons, animals or items that the user commonly encounters. A particular sound selected from the sound database 80 is assigned to a corresponding image from optical database 42. That image may be of a generic nature or alternatively may constitute a digital image of a specific person or other item known specifically to the user. The system may be programmed so that when the sensor detects the stored image, the assigned sound signal from the database is produced by the microprocessor and directed to the speaker system 22. As a result, the user is immediately apprised of the object or individual that has been detected by the system. The sound database acts analogously to a ring tone library currently used in cellular telephone technology. The CPU is programmed so that when a person, animal or other object is sensed a distinctive acoustic fingerprint or audio signature corresponding to the sensed image is selected from database 80. The audio signature or fingerprint may comprise any of a variety of audio characteristics including types of sound, frequencies, amplitudes, verbal formats, tempos, durations, intervals etc. that identify respective corresponding objects in accordance with instructions programmed into the CPU.

Intelligent software 18 may be automatically updated and redefined using standard programming techniques in order to adapt to the particular user's travel patterns and experiences. The software may be programmed using techniques known to persons skilled in the computer programming arts. The particular type of software employed may be adapted to the particular user's needs.

Figure 4:
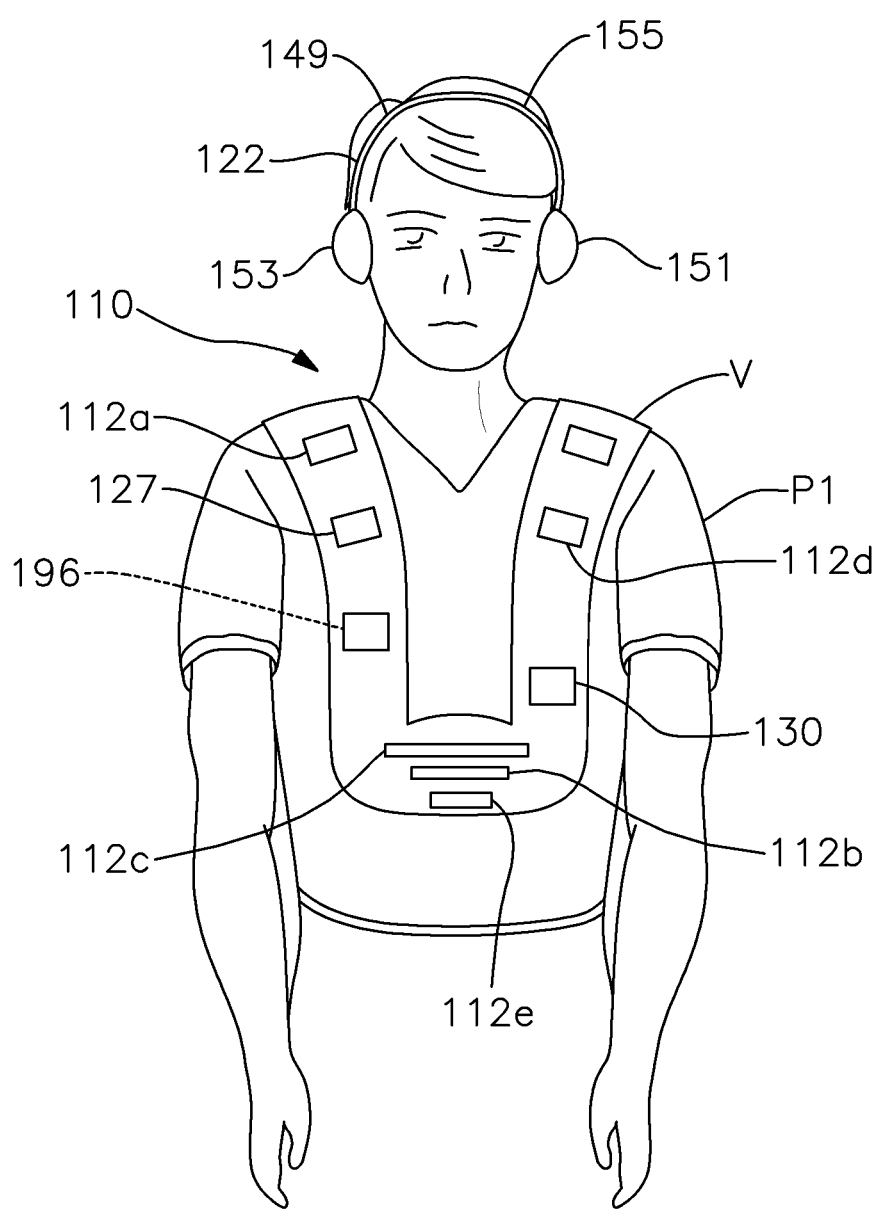
FIGS. 4 and 5 are front and rear elevational views respectively of a user employing an alternative version of the electronic guidance system, wherein the system is incorporated into a vest worn by the visually restricted user.
Figure 5:
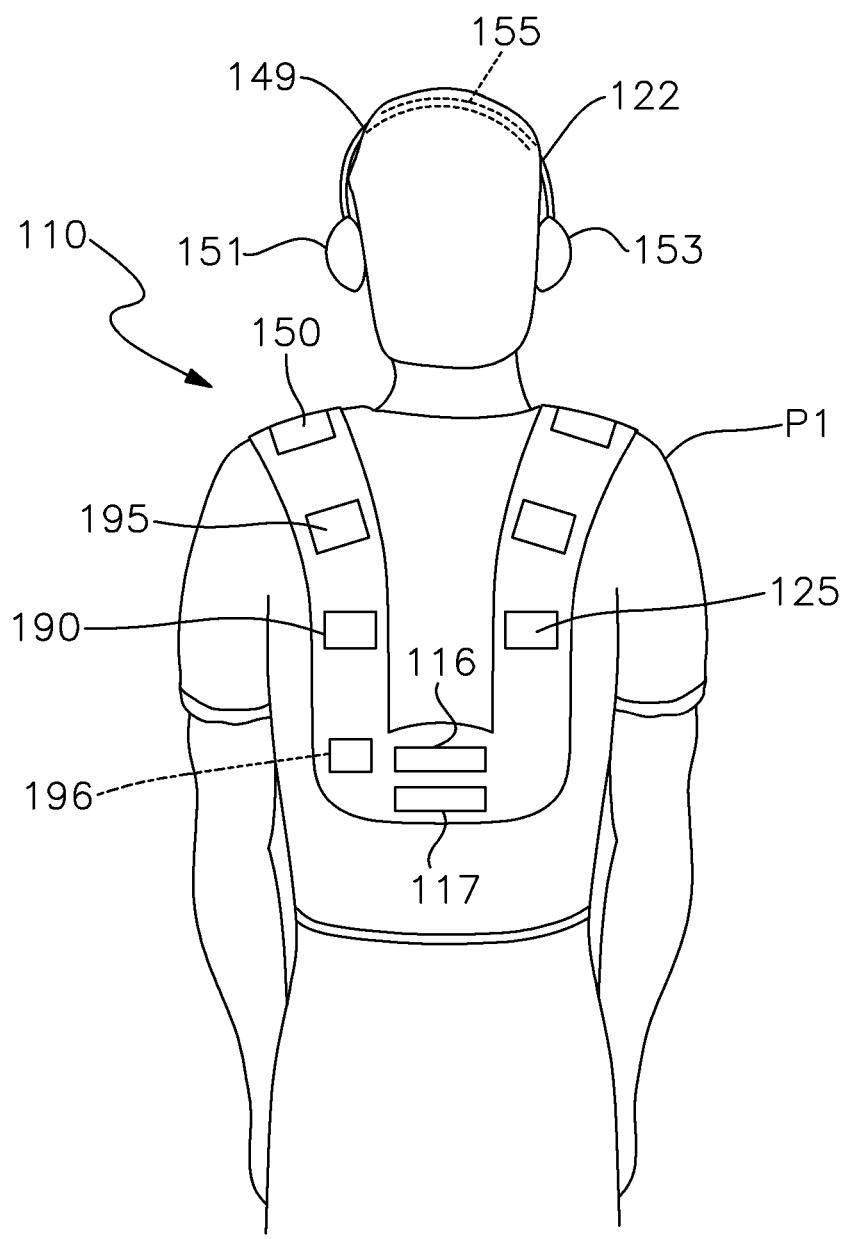

As shown in FIGS. 4 and 5, an alternative electronic guidance system 110 is incorporated in a vest V worn by a visually restricted person P1. System 110 is again designed to facilitate the user's movement between locations. The particular components of system 110 are depicted schematically in FIG. 6. It should be understood that vest V may be composed of various types of materials and should be constructed to fit comfortably across the shoulders of the user as shown or otherwise. The particular configuration and construction of the vest may be varied within the scope of this invention.

Specifically, system 110 again includes one or more various known types of sensor components including a high resolution (e.g. smart or digital) camera to optically detect approaching, passing, oncoming or otherwise proximate objects located within a predetermined spatial zone relative to user P1. The scanned spatial zones may vary in size and dimension based upon the nature of the space and pace at which the user is moving. A user walking at a pace of 2-4 MPH will typically want to scan a distance of about 5-6 feet ahead. Indoors a shorter distance of 2-3 feet ahead is preferable. If the user is moving at a faster pace (e.g. on a bicycle) a longer spatial distance may be utilized. The microprocessor may be programmed using conventional techniques to adjust the dimensions of the sensed spatial zones(s) to the pace at which the user is moving. At a minimum, the primary spatial zone should be set for the direction in which the user is traveling. For that reason, the various sensors 112a-112e are mounted on the front side of vest V. See FIG. 4 The high resolution camera is the preferred sensor for detecting the nature or identity of nearby persons or other objects. Laser detector 112b effectively ascertains information regarding moving vehicles that are traveling over a nearby roadway. Sonar detector 112e works most effectively in indoor locations. Radar detector 112d includes sensor components that operate using short wave and long wave detection respectively. Each of detectors 112b, 112d and 112e measures direction and distance. Infrared detector 112c effectively senses high temperature objects (i.e. fireplaces, stoves, construction machinery) that may pose a potential danger to the user). It should be understood that each of these sensors may be constructed to detect objects in various height zones as previously described. As in the previous embodiment, the sensor technology should be capable of detecting virtually any and all types of objects including fixed and moving items, inanimate objects and living things including persons and animals.

Each of the sensors generates electronic signals representative of sensed information concerning the detected objects. These signals are delivered either wirelessly or through a hardwired circuitry to central processing unit 116, FIGS. 4-5, which preferably comprises a programmable microprocessor powered by a rechargeable battery pack 117. Lithium ion batteries and various other known batteries may be employed for powering the system in accordance with this invention. Various types of programmable microprocessor architecture may be employed as will be understood by persons skilled in the art.

Figure 6:
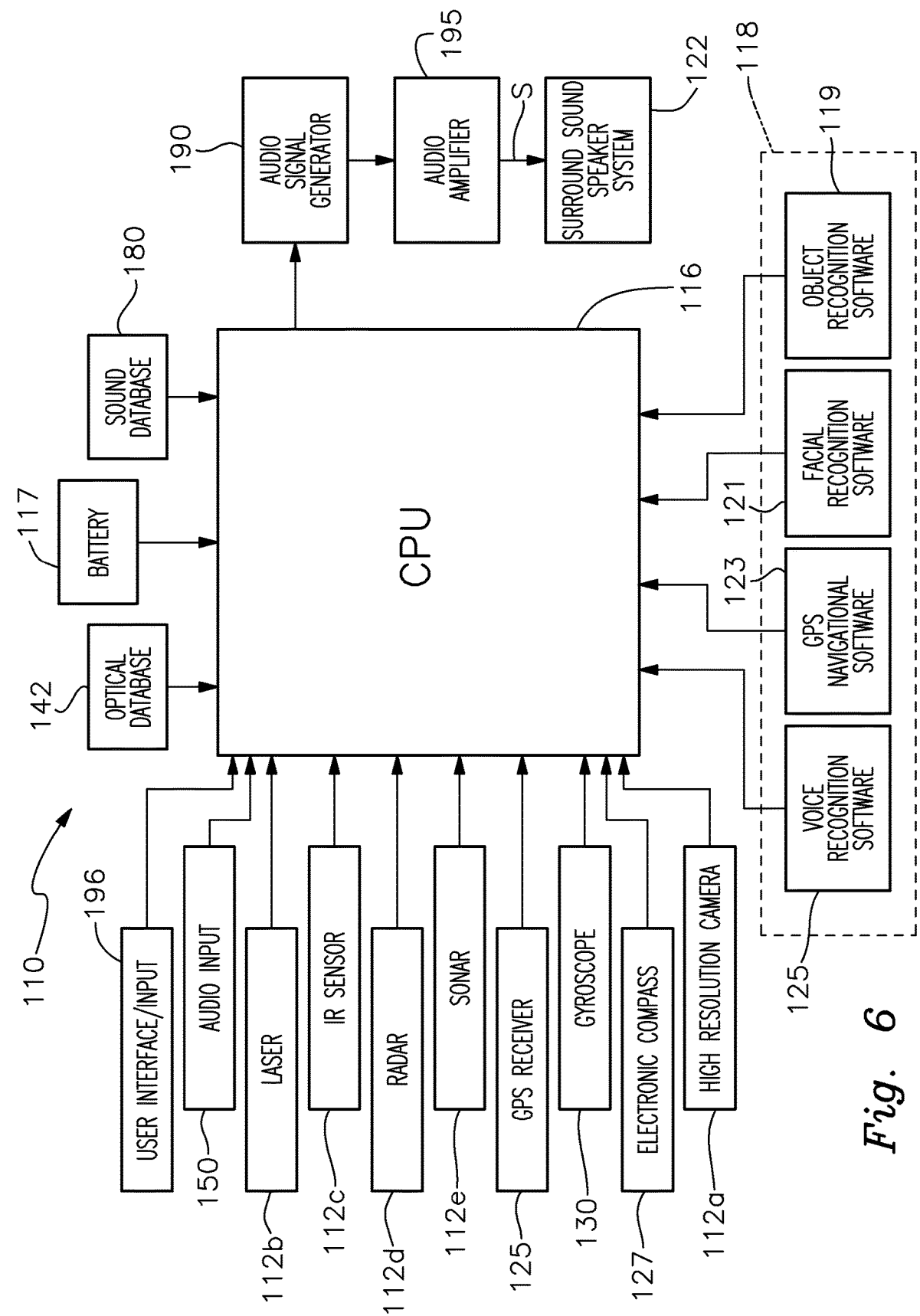
FIG. 6 is a schematic view depicting the principal components employed in the embodiment of FIGS. 4 and 5.

CPU 116 is programmed by means of intelligent software 118, FIG. 6, including, but not necessarily limited to, object recognition software 119, facial recognition software 121, GPS navigational software 123 and voice recognition software 125. CPU 116 receives input signals from the various sensors and software 118 determines audio or sound signals that correspond to the incoming electronic signals from the sensors. CPU 116 then directs an audio signal generator 190 to generate the corresponding audio signals as determined by the CPU. Such signals are then directed to an audio amplifier 195, which causes a corresponding sound to be generated by surround sound speaker system 122. See also FIGS. 4 and 5. It should be understood that the audio signal generator 190 and audio amplifier 195 may be formed independently of CPU 116 and mounted, for example, on the rear of the vest as shown in FIG. 5. Alternatively, those electronic components may be integrated with the CPU. In either case, the amplified audio signals S are preferably delivered wirelessly to speaker system 124. In alternative versions, the audio signals may be transmitted through the speaker system through wires. As with the microprocessor or CPU, the audio signal generator 190 and amplifier 195 may comprise various known types of electronic components whose construction and electronic interconnection will be understood to persons skilled in the art.

As previously described, CPU 116 may be programmed to scan predetermined spatial zones located in various directions and at assorted heights relative to the user, as well as at predetermined distances from the user. The electronic input signals (i.e. visual, laser, radar, sonar or infrared) are translated by software 118 within the CPU into respective audio signals that identify one or more of the nature/identity of the scanned object, the direction of the scanned object from the user and the distance of the object from the user, as well as relative movement/speed of the object. This warns the user of approaching or nearby objects and potential related dangers. Sound database 180 operates in conjunction with the sensors and CPU 116 to allow the user to assign specific sounds from the database to persons, animals or objects that the user commonly encounters. The sound database is utilized in the manner previously described with the embodiment of FIG. 1. Differing sounds having various respective acoustic fingerprints, audio signatures or sound characteristics, including but not limited to frequencies, amplitudes, audio patterns, tempos and intervals, as well as types of sounds (e.g. as produced by humans, animals, inanimate objects, etc.) may be produced in the manner previously described in order to identify the particular information that will assist the user in safely navigating his or her travels and avoiding potential dangers. In some versions a virtually unlimited number of verbal identifying sounds, comprising spoken words such as "automobile", "motorcycle", "bus", "street", "stairs", "curb", "John", "Mary" etc. in various languages may be retrieved from the sound database. The system thereby again permits the user to travel a desired route and avoid impediments, obstacles and dangers much more successfully and safely than has been heretofore possible.

Microprocessor 116 may similarly be provided with facial and object recognition software 119 and 121, respectively, that are used in conjunction with an optical database 142 having a virtually limitless supply of optical images representing commonplace objects and known persons. The user may input updated information as required into the microprocessor through use of a user interface/input 196, which may be optionally integrated into vest V on either the front or back sides of the vest as shown in FIGS. 4 and 5, respectively. As previously described, if user P1 is alerted to an upcoming obstacle by receiving an audio warning signal through speaker system 124, the user is able to quickly and conveniently research and ascertain the precise nature of the obstacle by directing an audio inquiry to the system via microphone 150. Voice recognition software 125 allows only the user or other authorized person to verbally access CPU 116. The microphone is preferably located on a shoulder portion of vest V so that the user P1 can readily communicate with CPU 116 through the proximate microphone 150. See FIG. 5. When a question is directed to microphone 150, software 119 or 121 instructs CPU 116 to compare the image sensed by camera 112a against stored images contained in optical database 142. The system is thereby able to instantly identify the individual, animal or other inanimate object in real time via speaker system 124.

CPU 116 may also be equipped with GPS navigational software 123. A GPS receiver 125 is mounted to vest V. These items again comprise conventional GPS equipment, which would be understood to persons skilled in the art. The GPS receiver and software operate to track the movements of user P1. They also allow the user to obtain needed geographic and directional information via audio input microphone 150. As in the previous embodiment, GPS navigational software 123 may be programmed so that the system audibly warn the user in real time that he or she is approaching an intersection, bridge, roadway or other potential danger.

Operation of the GPS system is improved by the additional incorporation of an electronic compass 127, FIG. 6. The compass is typically mounted on the front of the user's vest or otherwise on the front of the user, as depicted in FIG. 4. The compass relays real time directional information immediately to the CPU so that the direction of the user's travel is immediately ascertained. Without the compass, the GPS system is able to determine the user's location, but not the direction in which they are traveling. The compass thereby improves geographic and, in particular, directional guidance significantly and enables the user to receive virtually instantaneous, real time identification of a location and/or needed travel directions. The compass better enables the system to compensate for sudden movements by the user and enables the GPS navigation to operate much more effectively. It should be understood that the system may be programmed so that the audio signals that are directed relative to location and direction, are verbal in automotive GPS guidance systems.

Sound database 180 operates in conjunction with the sensors and CPU 116 to allow the user to assign specific sounds from the database to persons, animals or objects that the user commonly encounters. The sound database is utilized in the manner previously described with the embodiment of FIG. 1.

As in the previous embodiment, gyroscope 130 senses the inclination of user P1's torso. Appropriate software (which is part of intelligent translating software 118) within CPU 116 recognizes when the inclination exceeds a certain amount, which indicates that the user is bent over, stooping or slouched. This causes the CPU to direct audio signal generator 190 to produce an appropriate sound signal advising the user to properly adjust his or her posture. Assuming a proper posture enables all of the sensors to work more reliably and accurately and thereby makes the user's travels safer. The software used to program CPU 116 in accordance with this invention will employ standard programming techniques that will be known to persons skilled in the computer programming arts.

Figure 7:
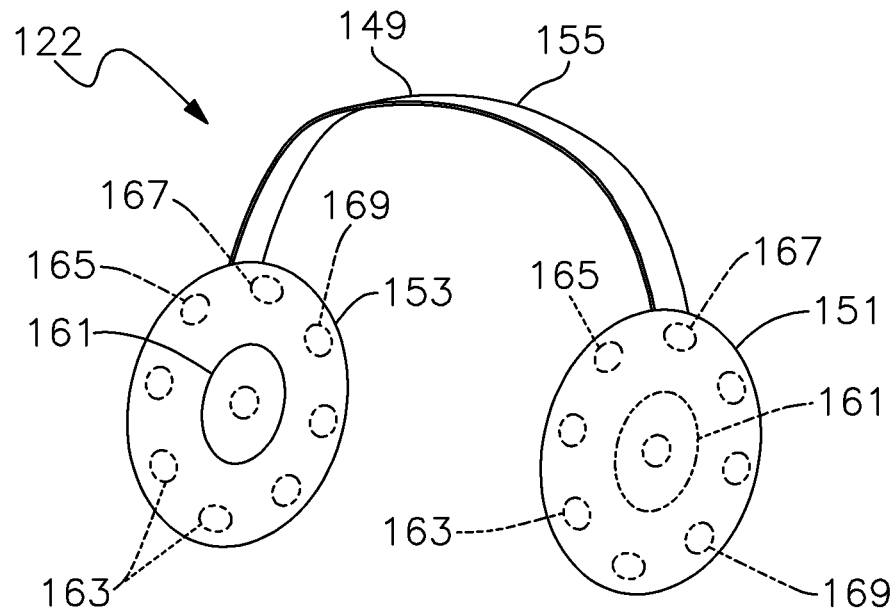
FIG. 7 is a perspective view of a speaker system utilized by the guidance system of this invention wherein the speaker units are embedded in earphones that sealably engage the ears of the user for providing real time audio signals to the user.
Figure 8:
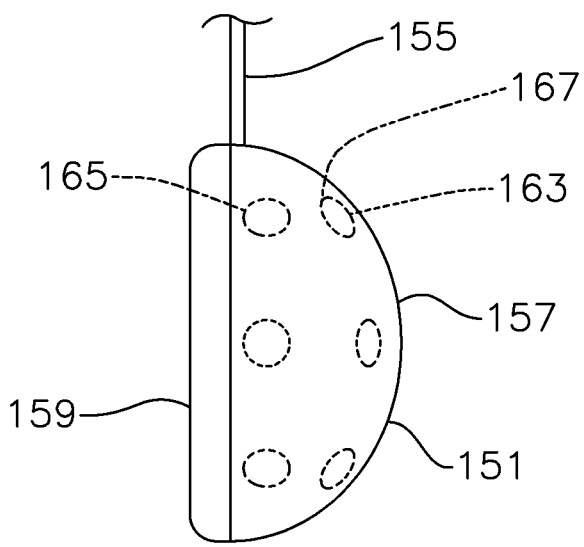
FIG. 8 is a front elevational front view of a respective one of the earphones employed in the surround sound speaker system shown in FIG. 7.

Surround sound speaker system 122 is depicted in FIGS. 7 and 8. The speaker system includes a pair of earphones 151 and 153 for covering and sealably engaging respective ears of user P1 when the headphone component 149 is worn by user P1 as shown in FIGS. 4 and 5. A resiliently flexible band 155 interconnects earphones 151 and 153 in a conventional manner.

Each of earphones 151 and 153 includes an earphone body 157 as depicted by representative earphone 151 in FIG. 8. A foam or otherwise padded ring 159 having a central opening 161 is mounted to body 157 in a conventional manner. Each earphone 151, 153 carries nine individual, directionally diverse speaker units 163. Each speaker unit comprises a standard speaker of the type commonly used in surround sound systems utilized in home theatres, music systems, etc., with the exception that subwoofer units are normally not utilized. Again, the speaker units may comprise piezo electric speakers or other compact electronic speakers of the type that will be known to persons skilled in the art. In particular, a first set of three speaker units 165 are mounted forwardly in each earphone base 157 such that the three speaker units 165 are arranged generally vertically within the earphone. By the same token, a second set of three individual speaker units 167 are arranged generally vertically along a midline of each earphone base. Finally, a third set of speaker units 169 are mounted rearwardly in the base of each earphone such that those three speaker units are also arranged generally vertically within the earphone. As further shown in FIG. 8, speaker units 165 are more or less vertically aligned or juxtaposed with third set of speaker units 169 such that the rearward set of speaker units are obscured by the forward set. The middle, second set of speaker units 167 are arranged in a generally arcuate manner facing the middle ear and positioned along or close to a vertical midline of the earpiece.

When headphone 145 is worn by user P1, as shown in FIGS. 4 and 5, the respective earphones 151 and 153 effectively sealably cover the user's corresponding ears. In this state, the first set of three speaker units 165 are arranged generally vertically over and are directed audibly toward the inner ear of the user. Second set of speaker units 167 are arranged generally vertically over and directed audibly toward the user's middle ear. Third set of speaker units 169 are arranged vertically over and directed audibly toward the user's outer ear. In this way, sounds from the individual speaker units are delivered from different respective directions to different portions of the user's ear canal. As a result, the audio signals generated by the system and received by the user, are processed by the user's brain in a manner that allows the user to differentiate between the respective audio signals. Following adequate training and experience using the system, the user will be able to innately discern the general direction of the object generating the signal. When this information is considered along with the audio characteristic (i.e. frequency, interval, duration, amplitude) of the generated audio signal, the trained user will be able to quickly and accurately determine the nature, distance, direction and movement of the sensed object. The produced audio signals effectively mimic or replicate what the user's brain would normally receive if the user was not visually restricted.

Figure 9:
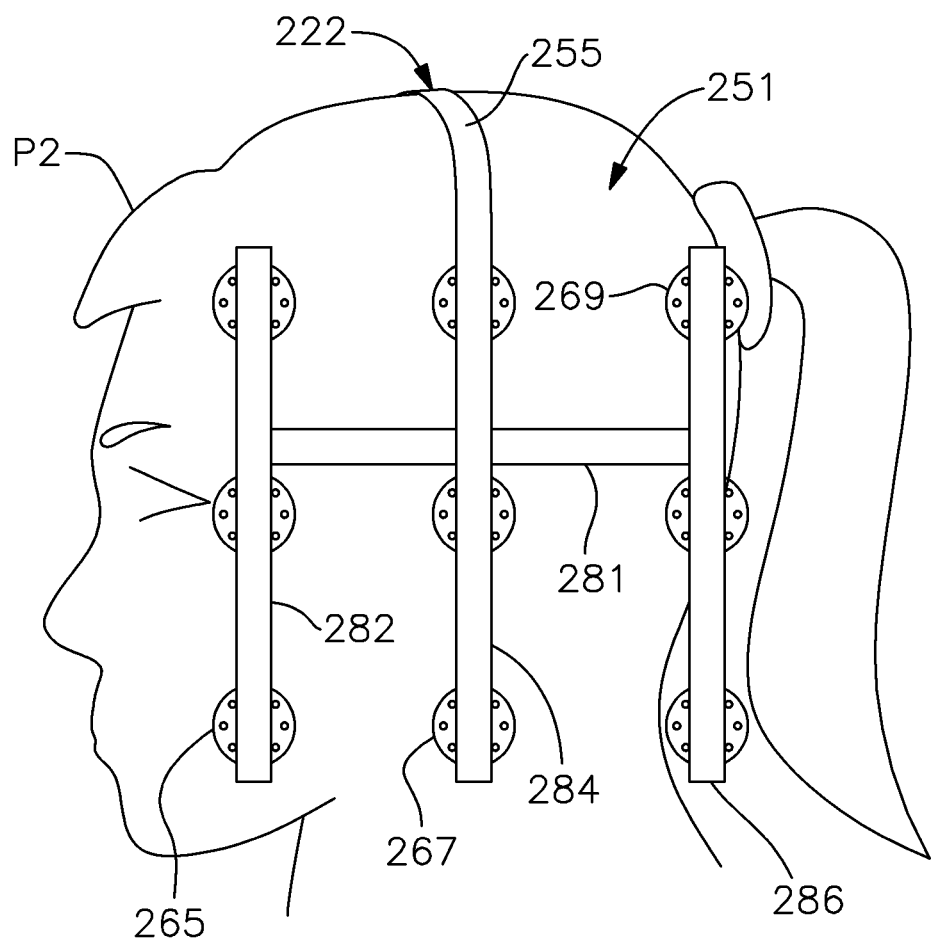
FIG. 9 is an elevational side view of an alternative open frame speaker system in accordance with this invention mounted on the head of the user and particularly depicting a representative one of the open frame earphones.
Figure 10:
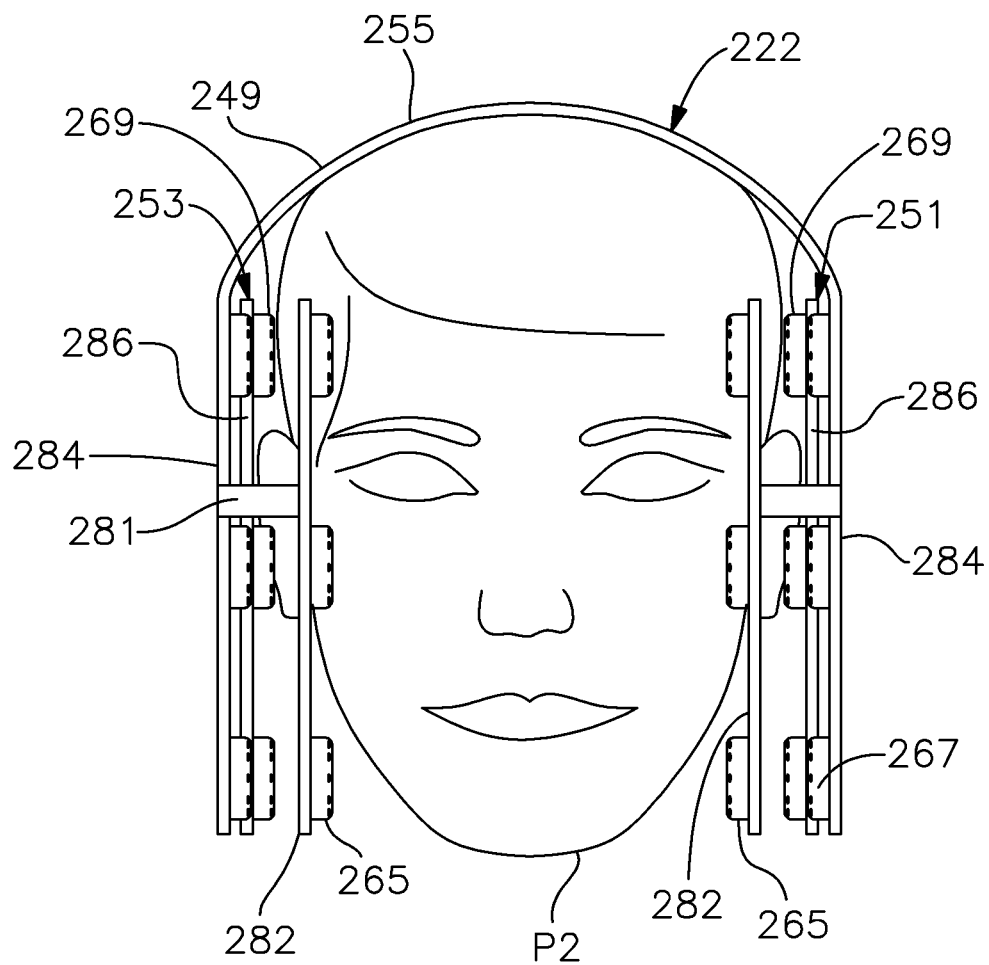
FIG. 10 is a front elevational view of the open frame speaker system depicted in FIG. 9.

FIGS. 9 and 10 depict an alternative open frame speaker system 222 that may be used in connection with the guidance system of this invention. In this case, the speaker system comprises a headset 249 that includes a pair of open frame earphones 251 and 253 that are interconnected by a flexible headband 255. User P2 dons headphone 249 by spreading band 255 and engaging the headband with his or her head as shown such that open frame earphone 251 covers the user's left ear and open frame earphone 253 covers the right ear.

Each of earphones 251 and 253 includes a horizontal support bracket 281 and three generally vertical speaker mounting brackets 282, 284 and 286 that are attached to horizontal support bracket 281 proximate the forward end, midpoint and rearward end respectively of the support bracket. Bracket 284 itself is preferably a continuation of headband 255 or is otherwise attached to the headband.

Each of the vertical speaker mounting brackets carries a respective set of individual speakers. In particular, each forward bracket 282 carries a first set of speakers 265. Each middle bracket 284 carries a second set of speakers 267. Finally, each of the rearward brackets 286 carries a third set of speaker units 269. Speaker units 265 are positioned above and forwardly of and are audibly directed at the user's inner ear. The middle speaker units 267 are arranged vertically above and directed audibly at the user's middle ear. The third set of speaker units 269 are arranged vertically above and rearwardly of and are directed audibly at the user's outer ear. This again provides for a directionally diverse array of nine individual speaker units that direct audio signals to respective parts of the user's ear canals so that directional information concerning sensed objects is more effectively and intuitively received by the user and processed by the user's brain.

In many if not most cases, an open frame system is preferred for blind and other visually impaired persons. Although the properly determined and generated audio signals are effectively directed to the user's ears in either disclosed version of the speaker system, the open frame nature of the system shown in FIGS. 9 and 10 also allows the user to more reliably receive other ambient and background sounds so that such sounds may also be effectively heard and processed by the user and acted upon to increase the user's safety and reduce the risk of the user experiencing a potentially dangerous encounter with an approaching object. In any event, each of the speaker systems disclosed herein as well as other alternative versions of the headphones and speaker system may be employed within the scope of this invention.

The electronic guidance system disclosed herein represents a significant improvement over existing guidance technology for visually impaired or restricted persons. The system effectively translates sensed signals into directionally oriented sounds which are transmitted naturally through the ear canal to the user's brain. The generated sounds immediately, intuitively and effectively enable the user's brain to determine the height, angular orientation, distance and, where applicable velocity, of an approaching item. Through the use of an intelligent camera as a sensor, the visually impaired or sight-restricted user is able to employ the audibly generated signals to then accurately determine the identity and/or nature of the approaching object or person. This greatly facilitates the ability of visually restricted persons to move freely and safely about. The independence, freedom and quality of life of visually impaired persons are thereby improved considerably. The guidance system of this invention provides significant and effective assistance to visually impaired persons. With sufficient training and experience such persons can use the system to effectively to ride a bicycle, jog on a sidewalks or on a beach, walk safely up and down stairs, negotiate elevators, navigate unfamiliar buildings and stores and participate in many activities previously unavailable to them.

It should be noted that the guidance system of this invention is effective for use not only by blind and other visually impaired persons, it can also be used by emergency personnel such as firefighters and EMT's to navigate a smoke-filled environment. The system can also be employed by law enforcement and rescue personnel to improve searching and travel through nighttime, inclement weather and/or foggy conditions. Military personnel also commonly encounter low-light conditions that would provide for advantageous use of the disclosed guidance system. The speaker system, in particular, may also be used beneficially in electronic gaming applications.

From the foregoing it may be seen that the apparatus of this invention provides for a multi-function electronic system for guiding and assisting the movement of visually impaired and restricted persons. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A system for guiding movement of a human user with restricted vision, said system: comprising;
   at least one object sensor for being worn by the user, each sensor for detecting objects in a predetermined spatial zone proximate the user and generating electronic signals representative of the detected objects;
   an electronic processing unit for determining sensed information about the detected objects, said information including at least one of the nature of the object, the distance of the sensed object from the user, the direction of the sensed object relative to the user and movement of the object relative to the user;
   means for translating said representative electronic signals into corresponding audio signals; and a speaker system for mounting over one or both ears of the user, said speaker system including at least one earphone, each said earphone for mounting over a respective underlying ear canal of the user, each said earphone including a plurality of directionally diverse speaker units directed at different respective portions of the user's underlying ear canal, said speaker units being responsive to said audio signals for generating audible sounds and delivering said audible sounds from different directions to the different respective portions of the underlying ear canal, whereby said audible sounds are received by the user and processed naturally and Intuitively by the user's brain, in real time, to allow the user to innately differentiate between the audio signals and Identify said sensed information about the detected objects.

2. The system of claim 1 in which said means for translating includes a programmable electronic processor responsive to said sensed electronic signals for receiving said electronic signals and determining audio signals that correspond thereto.

3. The system of claim 2 in which said means for translating further includes an audio signal generator responsive to said programmable electronic processor for generating audio signals that said processor determines correspond to the electronic signals received by said processor.

4. The system of claim 1 in which each said sensor includes one of the group consisting of an intelligent camera and a radar, sonar, laser, light and infrared detector.

5. The system of claim 1 in which at least one said sensor generates signals representing sensed Information about detected objects at multiple distinct height levels.

6. The system of claim 3 in which said audio signal produced by said audio signal generator generates a corresponding sound having a frequency indicating that said predetermined spatial zone is free of obstruction.

7. The system of claim 3 further including a database for storing Images of known objects and wherein said processor directs said audio signal generator to produce audio signals representative of said images of known objects in said object database.

8. The system of claim 1 in which said identifying sound includes an acoustic fingerprint comprising at least one of a representative frequency, amplitude, duration, type of sound, tempo, verbal language format and interval pattern that provide the identifying information about the sensed object.

9. The system of claim 1, in which said speaker system includes a headset for extending across and being worn on the user's head, each earphone being attached to a respective end of said headset and being positioned over a corresponding ear of the user when said headset is worn by the user.

10. The system of claim 1, in which each said earphone is for sealably engaging a corresponding ear of the user, said speaker units being mounted in a cavity of said earphone such that said speaker units are enclosed within said cavity of said earphone when said earphone is sealably engaged with the corresponding ear of the user.

11. The system of claim: 9 in which each earphone includes an open frame on which said speaker units are mounted, said frame including a horizontal support bracket attached to a respective end of said headpiece and three generally vertical brackets, each carrying a respective set of said speaker units.

12. The system of claim 11 in which each set of speaker units Includes a spaced apart pair of speaker units mounted to a respective generally vertical bracket proximate respective upper and lower ends of said bracket and a third speaker unit attached to said respective generally vertical bracket between said spaced apart pair of speaker units.

13. The system of claim 1 further including a gyroscope for attaching to a portion of the user's body to detect inclination of the portion of the user's body to which said gyroscope is attached relative an underlying surface of the earth, said gyroscope providing electronic signals indicative of such defected inclination to said processor, which processor generates an audio signal representative of said sensed inclination, which audio signal directs said speaker system to generate a sound representative of said sensed inclination.

14. The system of claim 2 further including a GPS system for generating electronic signals indicative of the user's location and for sending said electronic signals indicative of the user's location to said processor, which processor converts said location signals to audible direction signals that generate corresponding sounds from said speaker system.

15. The system of claim 14 further including an electronic compass that senses a direction in which the user is moving and for sending electronic signals indicative of such movement to said processor, said processor converting said electronic direction signals to an audible signal that is directed to said speaker system which generates a corresponding sound to indicate a direction in which the user is moving.

16. A system for guiding movement of a human user with restricted vision, said system comprising: at least one object sensor for being worn by the user, each sensor for detecting objects In a predetermined spatial zone proximate the user and generating electronic signals representative of the detected objects;
   an electronic processing unit for determining sensed information about the detected objects, said information including at least one of the nature of the object, the distance of the sensed object from the user, the direction of the sensed object relative to the user and movement of the object relative to the user;
   means, for translating said representative electronic signals into corresponding audio signals;
   and a speaker system for mounting over one or both ears of the user, said speaker system including a plurality of directionally diverse speaker units responsive to said audio signals for generating audible sounds that identify to the user, in real time, said sensed information about the detected objects, said speaker system including at least one earphone, each earphone for being worn over a corresponding ear of the user, said earphone carrying nine speaker units In an array wherein, when said earphone is operatively engaged with the user's ear, a first set of three speaker units are arranged generally vertically above and directed audibly toward the user's inner ear, a second set of three speaker units are arranged generally vertically above and directed audibly toward the user's middle ear and a third set of speaker units are arranged generally vertically above and directed audibly toward the user's outer ear.

17. A system for guiding movement of a human user with restricted vision, said system comprising: at least one object sensor for being worn by the user, each sensor for detecting objects in a predetermined spatial zone proximate the user and generating electronic signals representative of the detected objects;

an electronic processing unit for determining sensed information about the detected objects, said information including at least one of the nature of the object, the distance of the sensed object from the user, the direction of the sensed object relative to the user and movement of the object relative to the user;

means for translating said representative electronic signals into corresponding audio signals; and a speaker system including at least one earphone for mounting over a respective ear of the user, each said earphone carrying a plurality of directionally diverse speaker units responsive to said audio signals for generating audible sounds that Identify to the user, in real time, said sensed information about the detected objects, each said earphone including a first speaker unit positioned above and directed toward the user's inner ear, a second speaker unit positioned above and directed toward the user's middle ear and a third speaker unit positioned above and directed toward the user's outer ear, said first, second and third speaker units delivering said audible sounds torn different respective directions to different portions of the user's ear canal, whereby said audio signals are received by the user and processed naturally and intuitively by the user's brain, in real time, to allow the user to innately differentiate between the audio sounds and identify said sensed information about the detected object.

18. The system of claim 17 in which each said audible sound features an audio characteristic selected from at least one of the group including frequency, amplitude, audio pattern, duration, tempo and interval.

19. The system of claim 8 in which said audio signals are delivered to the different portions of the user's ear canal such that said audio signals are processed intuitively by the user's brain to identify the sensed information.

20. The system of claim 18 in which said audio signals are delivered to the different portions of the user's ear such that said audio signals are processed intuitively by the user's brain to identify the sensed information.

* * * * *